(12) United States Patent
Braun et al.

(10) Patent No.: US 9,901,214 B2
(45) Date of Patent: Feb. 27, 2018

(54) KITCHEN APPLIANCE COMPRISING POSITIONING DEVICE

(71) Applicant: Vorwerk & Co. Interholding GmbH, Wuppertal (DE)

(72) Inventors: Thomas Braun, Wuppertal (DE); Georg Hackert, Bochum (DE); Frank Starflinger, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 287 days.

(21) Appl. No.: 14/926,183

(22) Filed: Oct. 29, 2015

(65) Prior Publication Data

US 2016/0120367 A1 May 5, 2016

(30) Foreign Application Priority Data

Oct. 30, 2014 (DE) .................... 10 2014 115 788

(51) Int. Cl.
*A47J 43/046* (2006.01)
*A47J 27/21* (2006.01)
(Continued)

(52) U.S. Cl.
CPC .......... *A47J 43/046* (2013.01); *A47J 27/004* (2013.01); *A47J 27/2105* (2013.01); *A47J 43/0727* (2013.01); *A47J 43/0766* (2013.01)

(58) Field of Classification Search
CPC .... A47J 27/004; A47J 27/2105; A47J 43/046; A47J 43/0727; A47J 43/0766
See application file for complete search history.

(56) References Cited

U.S. PATENT DOCUMENTS 2,269,689 A * 1/1942 Reichold ............... A47J 27/004
219/435
4,174,073 A * 11/1979 Maher ................... A47J 43/046
241/282.1
(Continued)

FOREIGN PATENT DOCUMENTS

DE 102010016090 A1 * 9/2011 .......... A47J 43/0716
DE 102014115788 A1 * 5/2016 .......... A47J 43/0727
(Continued)

*Primary Examiner* — Tony G Soohoo
(74) *Attorney, Agent, or Firm* — Collard & Roe, P.C.

(57) ABSTRACT

The invention relates to a kitchen appliance, in particular a mixer, comprising a housing (2), on which a vessel (3) can be arranged, wherein the housing (2) has a vessel receiving area (4), to which the vessel (3) can be connected, wherein the vessel (3) and the vessel receiving area (4) have electric contacts (5, 6, 7, 8) for connecting an electric device of the vessel (3), in particular a heating device and/or a measuring device, to a power supply of the kitchen appliance. To create an alternative and more comfortable option for positioning the electric contacts, it is proposed for the kitchen appliance and/or the vessel (3) to have a positioning device (10), which is embodied to position the electric contacts (5, 6) of the vessel (3) and the electric contacts (7, 8) of the vessel receiving area (4) relative to one another in an active manner, so that they can be transferred from a separated position into a contact position, so as to establish an electric connection between the vessel (3) and the kitchen appliance, wherein the contacts (5, 6) of the vessel (3) are movably arranged on the vessel (3) and/or the contacts (7, 8) of the vessel receiving area (4) are movably arranged on the vessel receiving area (4).

18 Claims, 9 Drawing Sheets

Figure 1:
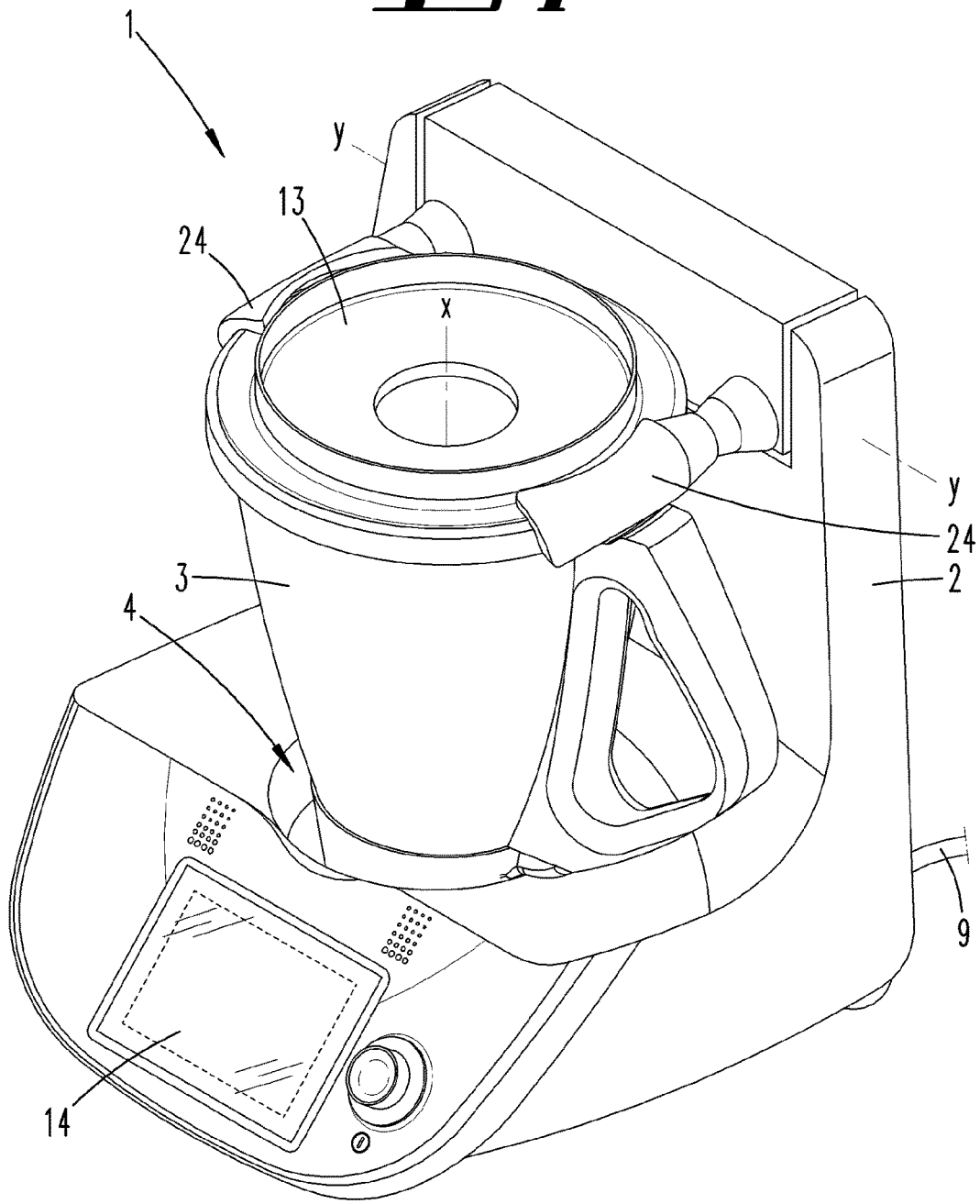

(51) Int. Cl.
*A47J 27/00* (2006.01)
*A47J 43/07* (2006.01)

(56) References Cited

U.S. PATENT DOCUMENTS

| | | | | |
|---|---|---|---|---|
| 6,513,966 | B1* | 2/2003 | Gort-Barten | A47J 43/0766 241/37.5 |
| 9,144,348 | B2* | 9/2015 | Fevre | A47J 27/004 |
| 2002/0012288 | A1* | 1/2002 | Masip | A47J 43/046 366/205 |
| 2002/0071340 | A1* | 6/2002 | Juriga | A47J 43/0766 366/205 |
| 2008/0264270 | A1* | 10/2008 | Peng | A47J 43/0716 99/331 |
| 2009/0260523 | A1* | 10/2009 | Peng | A47J 27/004 99/348 |
| 2011/0005402 | A1* | 1/2011 | Huang | A47J 43/0722 99/331 |
| 2016/0120367 | A1* | 5/2016 | Braun | A47J 43/0727 366/314 |

FOREIGN PATENT DOCUMENTS

| | | | | |
|---|---|---|---|---|
| EP | 3017737 A1 * | 5/2016 | ......... | A47J 43/0727 |
| WO | 03/001952 A1 | 1/2003 | | |
| WO | WO 03001952 A2 * | 1/2003 | ......... | A47J 27/2105 |
| WO | 03/075727 A1 | 9/2003 | | |
| WO | WO 03075727 A1 * | 9/2003 | ......... | A47J 43/0716 |
| WO | WO 2014016117 A1 * | 1/2014 | ......... | A47J 43/0716 |

\* cited by examiner

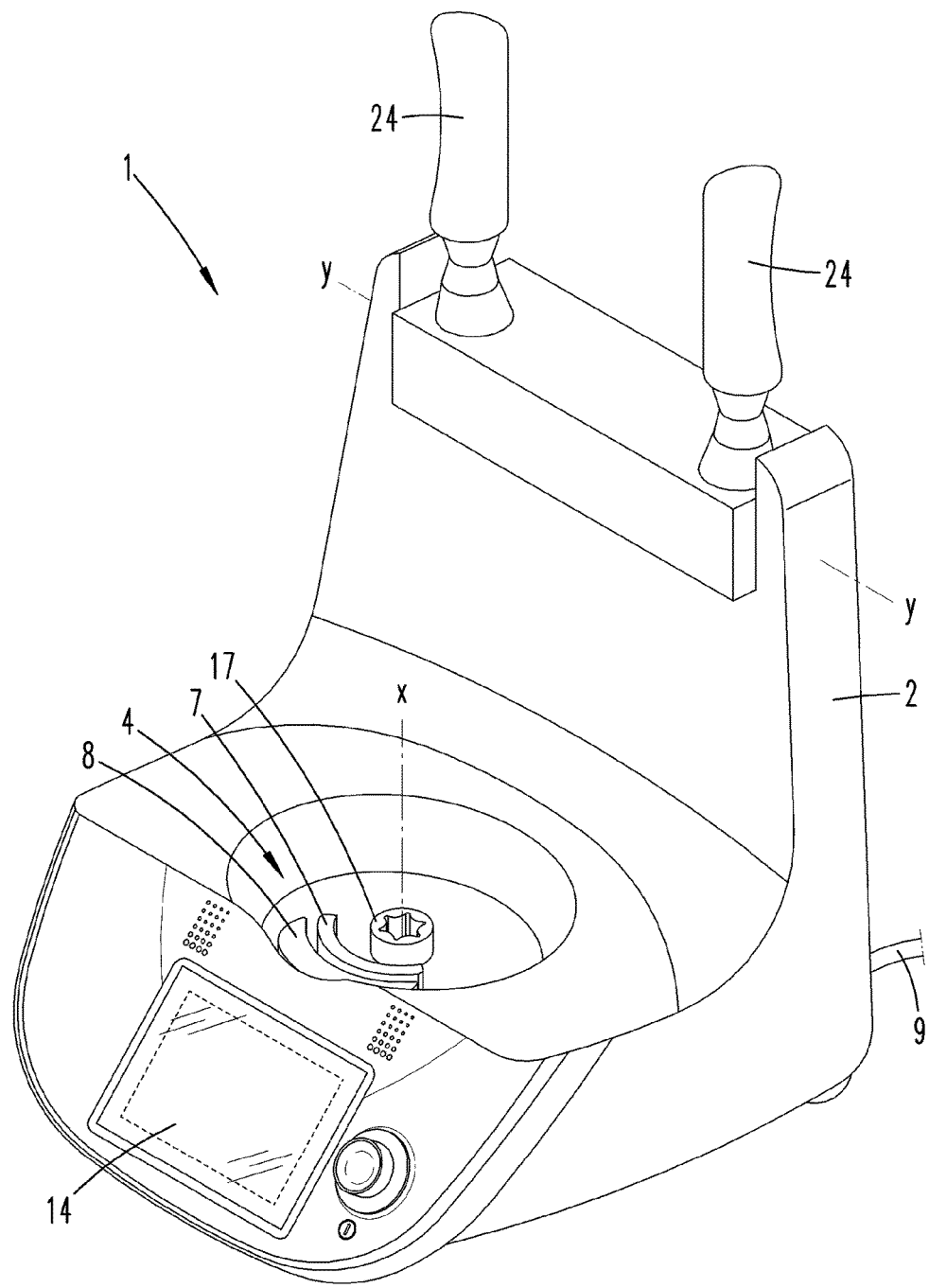

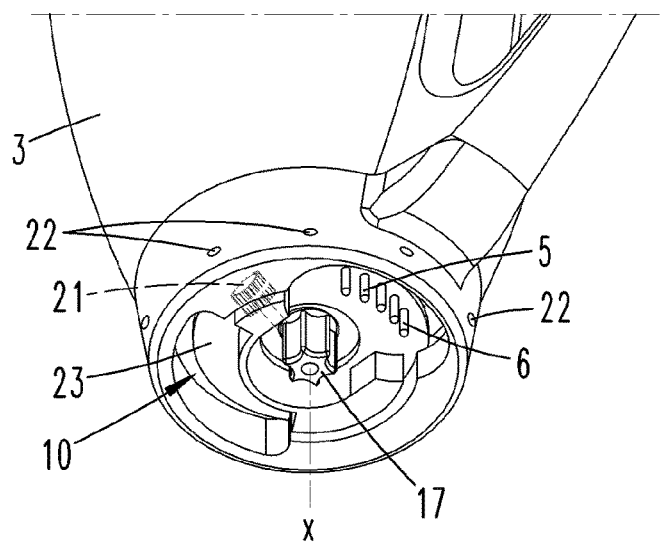
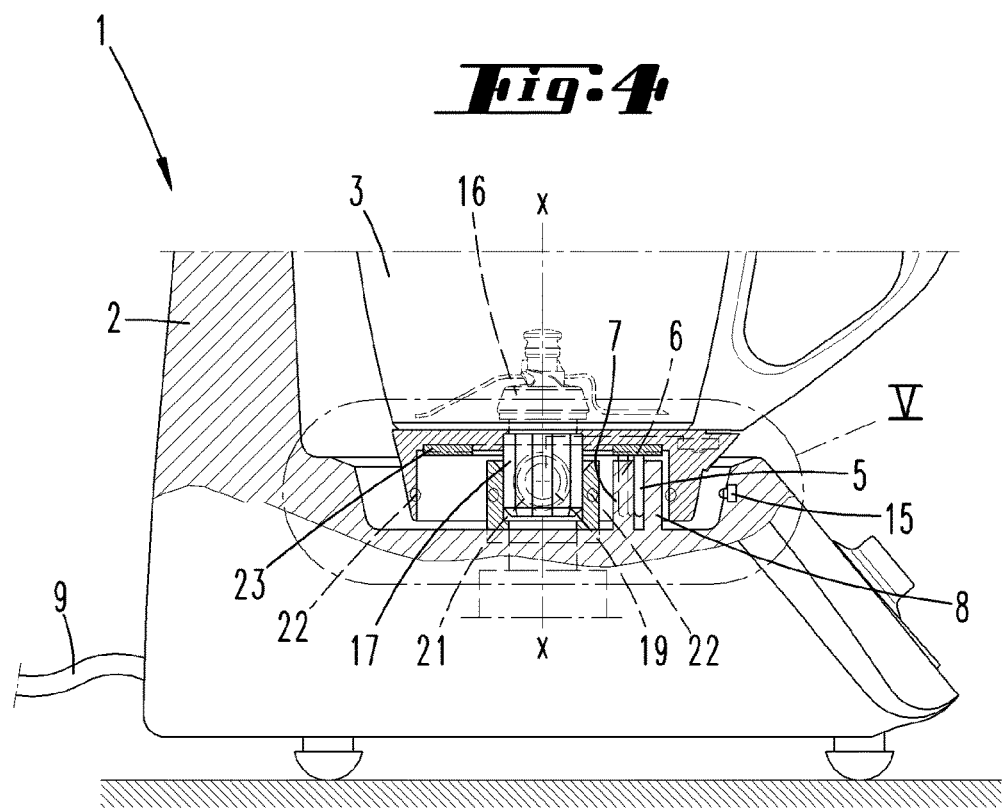

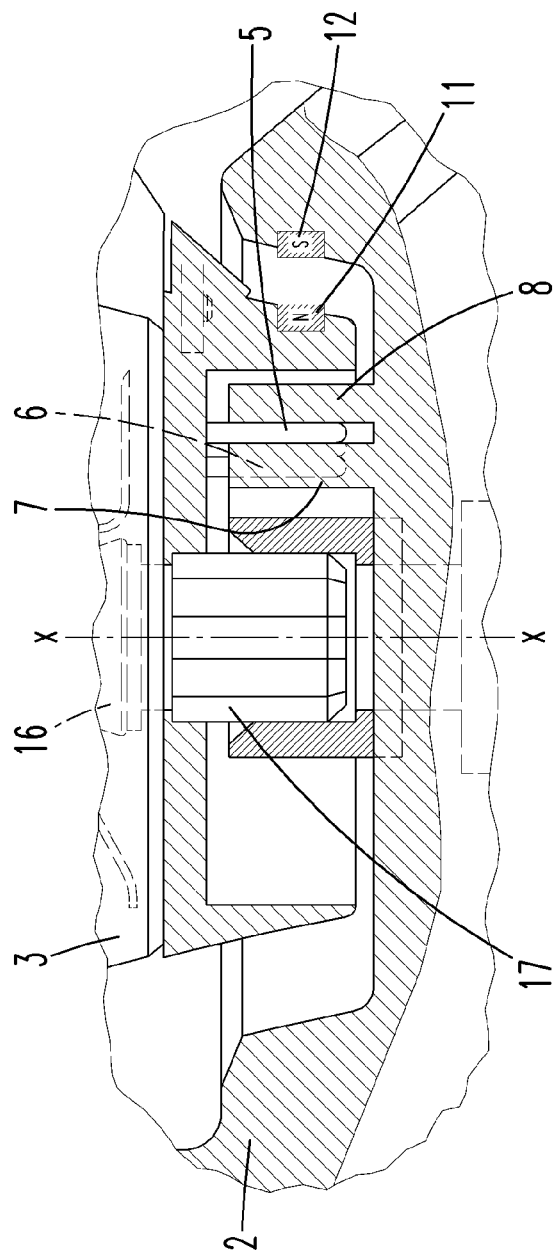

KITCHEN APPLIANCE COMPRISING POSITIONING DEVICE

CROSS REFERENCE TO RELATED APPLICATIONS

Applicant claims priority under 35 U.S.C. §119 of German Application No. 10 2014 115 788.5 filed on Oct. 30, 2014, the disclosure of which is incorporated by reference.

The invention relates to a kitchen appliance, in particular a mixer, comprising a housing, on which a vessel can be arranged, wherein the housing has a vessel receiving area, to which the vessel can be connected, wherein the vessel and the vessel receiving area have electric contacts for connecting an electric device of the vessel, in particular a heating device and/or a measuring device, to a power supply of the kitchen appliance.

Kitchen appliances of the type in question are known. They have a removable vessel, for example, in which a mixing unit for preparing food is arranged, for example. The mixing unit is driven via an electric motor on the kitchen appliance side, for the purpose of which the vessel receiving area and the vessel have corresponding coupling elements. In addition, it is also known to attach a heating device to the vessel, for example in a bottom area of the vessel. In addition, provision can also be made on the vessel for electric measuring devices for measuring a temperature, a pressure or the like.

To be able to operate the afore-mentioned electric devices, provision is made on the vessel and the housing of the kitchen appliance for electric contacts, which can be transferred from a separated position into a contact position so as to establish an electric connection.

Publication WO 2003/001952 A3, for example, discloses a vessel comprising a heatable vessel bottom and water-tight electric contacts for connection to corresponding electric contacts of a kitchen appliance.

To transfer the electric contacts of the vessel and the electric contacts of the vessel receiving area into a contact position, it is known to embody the housing of the kitchen appliance in such a manner that the shape of the housing supports a user of the kitchen appliance in bringing the vessel into the contact position. Publication WO 2003/075727 A1, for example, discloses a geometric shape of the housing, which has two jaws arranged opposite one another, which in each case partially encompass the vessel circumferentially and which receive recess areas, which are defined in a V-shaped manner, between one another. The recess areas display the desired orientation of the vessel inside the housing, wherein the manual positioning by the user is supported by a corresponding design of vessel and housing.

Based on the afore-mentioned prior art, it is the object of the invention to create an alternative and more comfortable option for positioning the electric contacts.

To solve the afore-mentioned object, the invention proposes for the kitchen appliance and/or the vessel to have a positioning device, which is embodied to position the electric contacts of the vessel and the electric contacts of the vessel receiving area relative to one another in an active manner, so that they can be transferred from a separated position into a contact position, so as to establish an electric connection between the vessel and the kitchen appliance, wherein the contacts of the vessel are movably arranged on the vessel and/or the contacts of the vessel receiving area are movably arranged on the vessel receiving area.

According to the invention, the kitchen appliance is equipped with a positioning device, which transfers the electric contacts of the vessel and/or the electric contacts of the vessel receiving area in an active manner, so as to establish an electric connection between the vessel and the kitchen appliance. To date, the positioning of the electric contacts has been attained via a manual positioning of the vessel relative to the kitchen appliance, wherein the vessel is positioned passively by means of correspondingly molded partial areas of the housing of the kitchen appliance in combination with the weight of the vessel. The positioning of the contacts now does not take place by means of a positioning of the vessel relative to the housing of the kitchen appliance, but rather by means of a positioning of the contacts themselves, which are movably arranged on the vessel or the vessel receiving area, respectively. To position the contacts, it is thus no longer required to position in the vessel in its entirety relative to the vessel receiving area.

The movable arrangement of the electric contacts on the vessel or the vessel receiving area, respectively, can take place in different ways.

It is proposed according to an embodiment alternative for the positioning device to have a rotary plate, on which the contacts of the housing or the contacts of the vessel receiving area are arranged. The rotary plate can be connected to a power supply via a sliding contact and can allow a movement of the electric contacts relative to the vessel or the vessel receiving area, respectively, by maintaining the contacting. The positioning device, in particular the rotary plate, can thereby on principle be assigned to the vessel or to the housing of the kitchen appliance. In the alternative, the vessel as well as the housing can in each case have their own positioning device, which interact with one another. If the positioning device is arranged on the vessel, the electric contacts of the vessel are positioned in an active manner by means of the rotation of the rotary plate, while the electric contacts of the housing remain stationary. If the housing or the vessel receiving area, respectively, has a positioning device, the electric contacts of the housing are positioned in an active manner, while the electric contacts of the vessel remain stationary with regard to the vessel.

As an alternative to a rotary plate, the positioning device can also have different movable adjusting devices, for example an x-y adjustable table or the like.

It is proposed for the positioning device to have an electric motor for positioning the contacts, for example by rotating the rotary plate. The positioning of the electric contacts is automated with the help of the electric motor. The user of the kitchen appliance does no longer need to orient the electric contacts of the vessel and of the kitchen appliance manually relative to one another. The positioning device, which operates with an electric motor, thereby has an electric motor in addition to the rotary plate, and, advantageously, an adjusting mechanism, such as a gear rim, a linearly shiftable actuator or the like, for example. The adjusting mechanism is driven by means of the electric motor and effects the rotation of a rotary plate, for example, on which the electric contacts are arranged. If the contacts of the vessel and the contacts of the housing of the kitchen appliance do not have a position yet, which allows for establishing an electric connection, the electric contacts of the vessel and/or the electric contacts of the housing can be brought into a position, which corresponds to a contact position of the electric contacts, by rotating the rotary plate. Advantageously, the electric contacts of the vessel can be arranged on a circular path, for example, wherein the electric contacts of the housing are also arranged on a circular path comprising the same radius, so that the electric contacts can be oriented so as to correspond to one another until a contact position has been reached in response to a rotation of the rotary plate of the vessel and/or of the housing. In the contact position, the electric contacts are advantageously located on top of one another in vertical projection. The electric contacts can thereby be plug-in contacts, surface contacts (for example on a structured printed circuit board) or the like.

In the alternative, it is proposed for the positioning device to encompass spring elements, by means of which the contacts of the vessel and/or the contacts of the vessel receiving area are spring-loaded. The electric contacts themselves can thereby be embodied as spring elements or can be in operative connection with a separate spring element. If the contacts are embodied as spring elements, the contacts can be made of an electrically conductive material, for example, or can be coated with such a material. If the contact and the spring element are separate components, the contact can be arranged adjacent to a spring element, wherein the contact is shifted in response to the expansion of the spring element. The positioning device embodied with spring elements works without a separate electric motor. For example, the positioning device can be arranged on the housing of the kitchen appliance, wherein a component, which prevents the spring element from expanding, is pushed to the side by means of an inserted vessel, in response to which the spring element can expand and can act against an electric contact. By inserting the vessel, the spring element thus expands and the electric contact, which is shifted by the spring element, is positioned. The electric contact of the housing is thereby shifted until is hits a corresponding electric contact of the vessel, which engages with the displacement path of the contact of the housing. In response to a separation of the vessel from the vessel receiving area of the kitchen appliance, a resetting, that is, compression, of the spring element can take place analogously, so that the spring element can expand for a new contacting. The resetting of the spring element thereby takes place, for example, in that a second spring element, which is pushed aside by the vessel, expands in response to the removal of the vessel, and acts against the first spring element, so that the latter is shifted into the compressed initial position again. As a whole, the positioning device acts like a spring-loaded switch, which effects a positioning of the electric contacts, initiated by the insertion or removal of the vessel relative to the housing.

A kitchen appliance, in particular a mixer, comprising a housing, on which a vessel can be arranged, is also proposed with the invention, wherein the housing has a vessel receiving area, to which the vessel can be connected, wherein the vessel and the vessel receiving area have electric contacts for connecting an electric device of the vessel, in particular a heating device and/or a measuring device, to a power supply of the kitchen appliance, wherein the kitchen appliance and/or the vessel have a positioning device, which is embodied to position the electric contacts of the vessel and the electric contacts of the vessel receiving area to one another in such a manner that they can be transferred from a separated position into a contact position, so as to establish an electric connection between the vessel and the kitchen appliance, wherein the positioning device has magnets, and wherein a first magnet is arranged on the vessel receiving area and a second magnet is arranged on the vessel.

According to this embodiment alternative, the kitchen appliance has a positioning device, which has corresponding magnets on the vessel receiving area and the vessel. One of the corresponding magnets can thereby be a magnetizable or magnetic partial area of the vessel receiving area or of the vessel, respectively. In particular, a partial area of the vessel or of the vessel receiving area can have an iron-containing and/or nickel-containing material. Advantageously, at least one of the magnets is a permanent magnet, so that the positioning device is independent from an electric power supply at the same time. The magnet can thereby either be arranged directly on the vessel or the vessel receiving area, respectively, or, in the alternative, on a component, which is movably connected to the vessel or the vessel receiving area, respectively, and which has electric contacts. In the first case, in the case of which the magnets are arranged directly on the vessel or the vessel receiving area, respectively, the electric contacts are positioned by means of a movement of the vessel relative to the vessel receiving area. If a user inserts the vessel into the vessel receiving area in a "deadjusted" manner—based on a contact position, the magnetic pull results in a shifting of the vessel inside the vessel receiving area, advantageously in a rotation, until the desired contact position has been reached. In the second case, in the case of which the magnets are arranged on components, which are movably connected to the vessel or the vessel receiving area, respectively, a movement of the components, which have the magnets—and also the electric contacts— occurs when the user does not insert the vessel into the vessel receiving area in the contact position. The components are moved towards one another as a result of the magnetic force, until the contact position has been reached for establishing an electric connection between the vessel and the vessel receiving area of the kitchen appliance.

The invention furthermore proposed for the kitchen appliance to have a detection device, which is embodied to detect a current position of the contacts. The detection device can be used in combination with all of the afore-represented kitchen appliances, which have a positioning device according to the invention, that is, in connection with an active positioning of the contacts by motor power or spring force, as well as in connection with a passive positioning by magnetic force. The detection device thereby detects, whether the contacts of the vessel and of the vessel receiving area are currently arranged in a separated position or in a contact position. In the cases, in which the contacts of the vessel receiving area are stationary, the current position of the contacts (separated position or contact position, respectively) can solely be detected by means of the position of the contacts of the vessel. A detection of the position of all contacts is advisable in other cases, for example when the contacts of the vessel as well as the contacts of the vessel receiving area are arranged on movable components.

The detection device can be an optical detection device, an ultrasound detection device, an induction detection device or the like. An optical detection device can have a common camera chip, for example, for example a CCD chip or CMOS chip. In the alternative, it is also possible to use other optical detection devices, which utilize light barrier arrangements, for example. A display device comprising a display, on which a user of the kitchen appliance can see whether the electric contacts of the vessel and of the vessel receiving area are located in a contact position or in a separated position, can be assigned to the detection device in any event. If only a separated position exists currently, for example, the user can orient the vessel manually to the vessel receiving area, until it is displayed on the display that the contact position has been reached. The reaching of the contact position can additionally be displayed by means of an acoustic signal (signal tone).

It is furthermore proposed for the detection device to be assigned to the positioning device. The detection signal of the detection device can thus be used for an automatic operation of the positioning device. For this purpose, the detection result is transferred to an analysis and control device, for example for an analysis of the current position, which transmits a positioning command to the positioning device, which is suitable to transfer the electric contacts from the separated position into the contact position.

It is proposed in particular for the kitchen appliance to have an analysis and control device, which is embodied to compare a current position of the contacts detected by the detection device to a position of the contacts, which is required for the electric connection, and to transmit a positioning command to the positioning device as a function of the result of the comparison. A fully automatic positioning of the electric contacts can be effected into the contact position by means of this embodiment. According to the invention, an actual/target comparison takes place thereby, in response to which a current position of the contacts is compared to a desired position of the contacts and a positioning command is transmitted to the positioning device as a function of the result of the comparison. The result of the comparison between the actual position and the target position of the contacts can specify an angular range, for example, by which the vessel needs to be rotated relative to the vessel receiving area, so as to reach the contact position. Accordingly, the positioning command then includes a rotation command, which transfers a rotary plate of the vessel receiving area, for example, into the desired contact position, so that the electric contacts of the vessel and the electric contacts of the vessel receiving area are arranged in a contact position in a corresponding manner, for example are located on top of one another, based on a vertical projection of the kitchen appliance.

The invention will be specified in more detail below by means of an exemplary embodiment.

Figure 5:
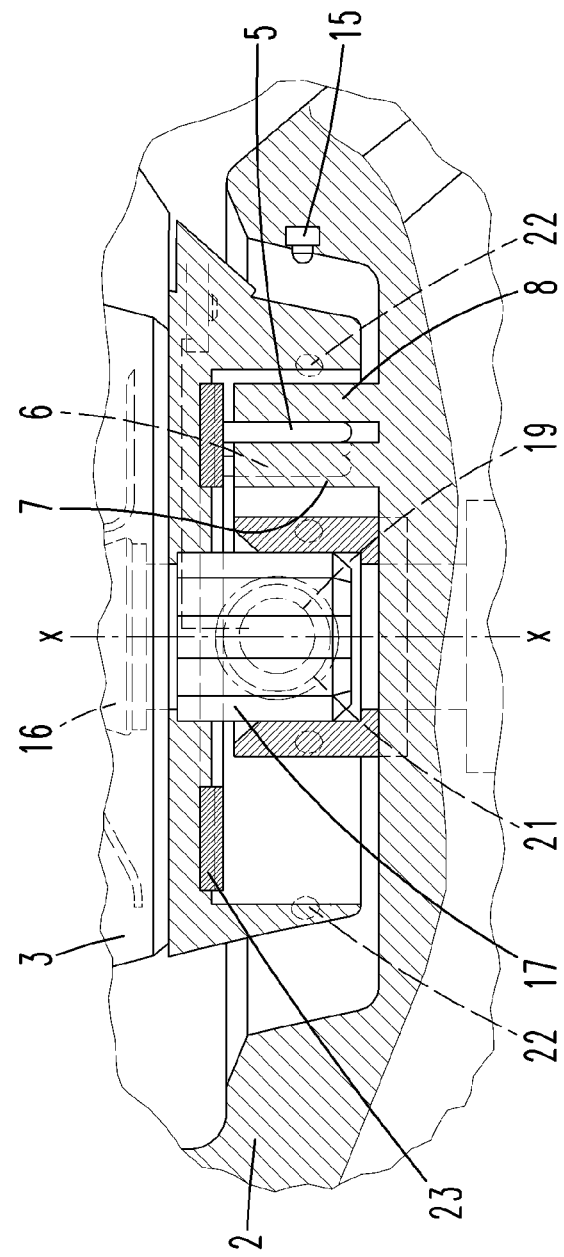
Figure 6:
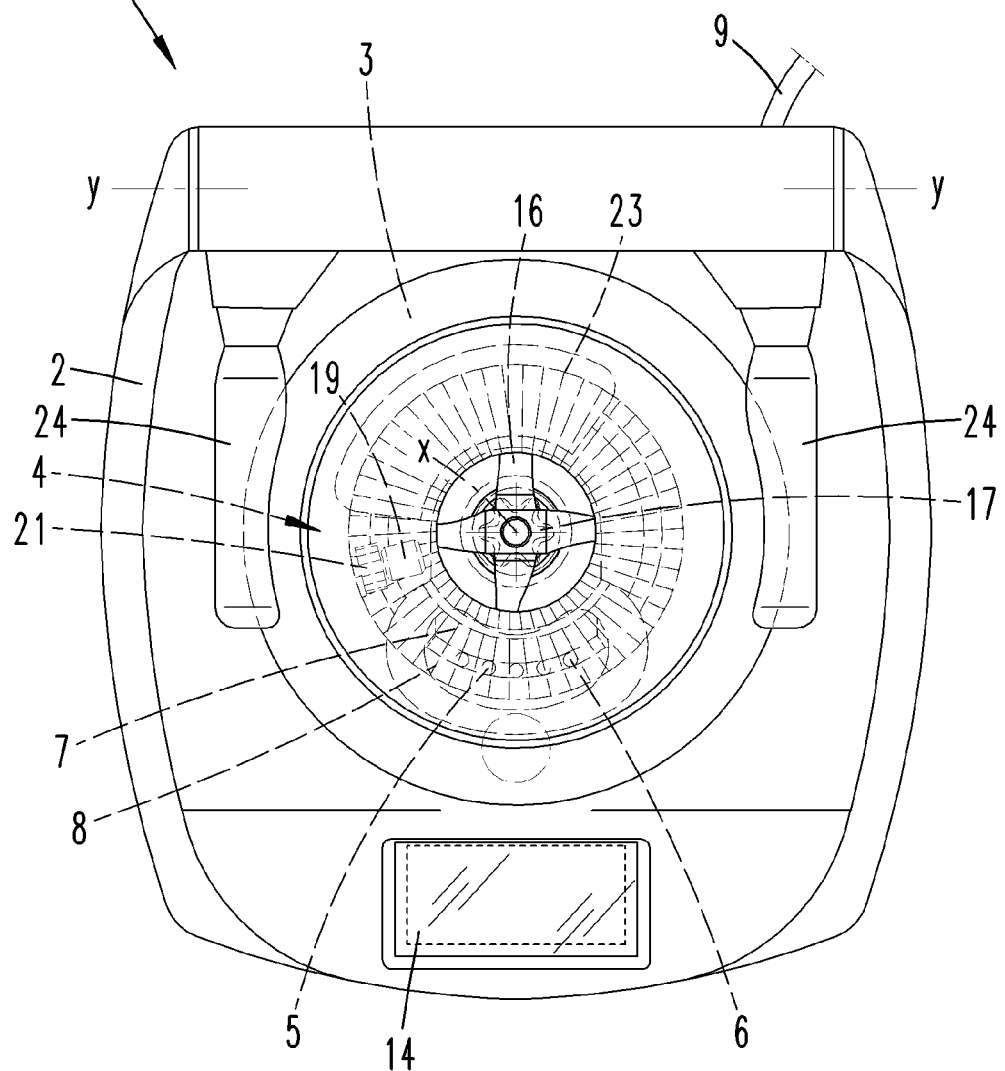
Figure 7:
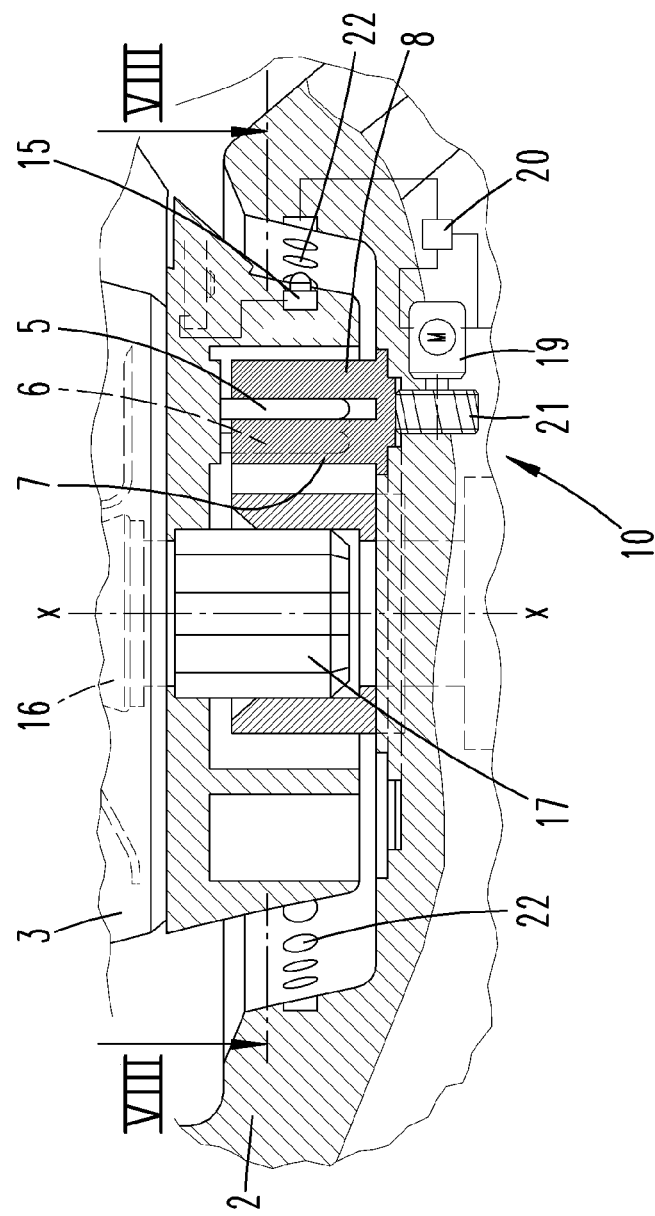
Figure 8:
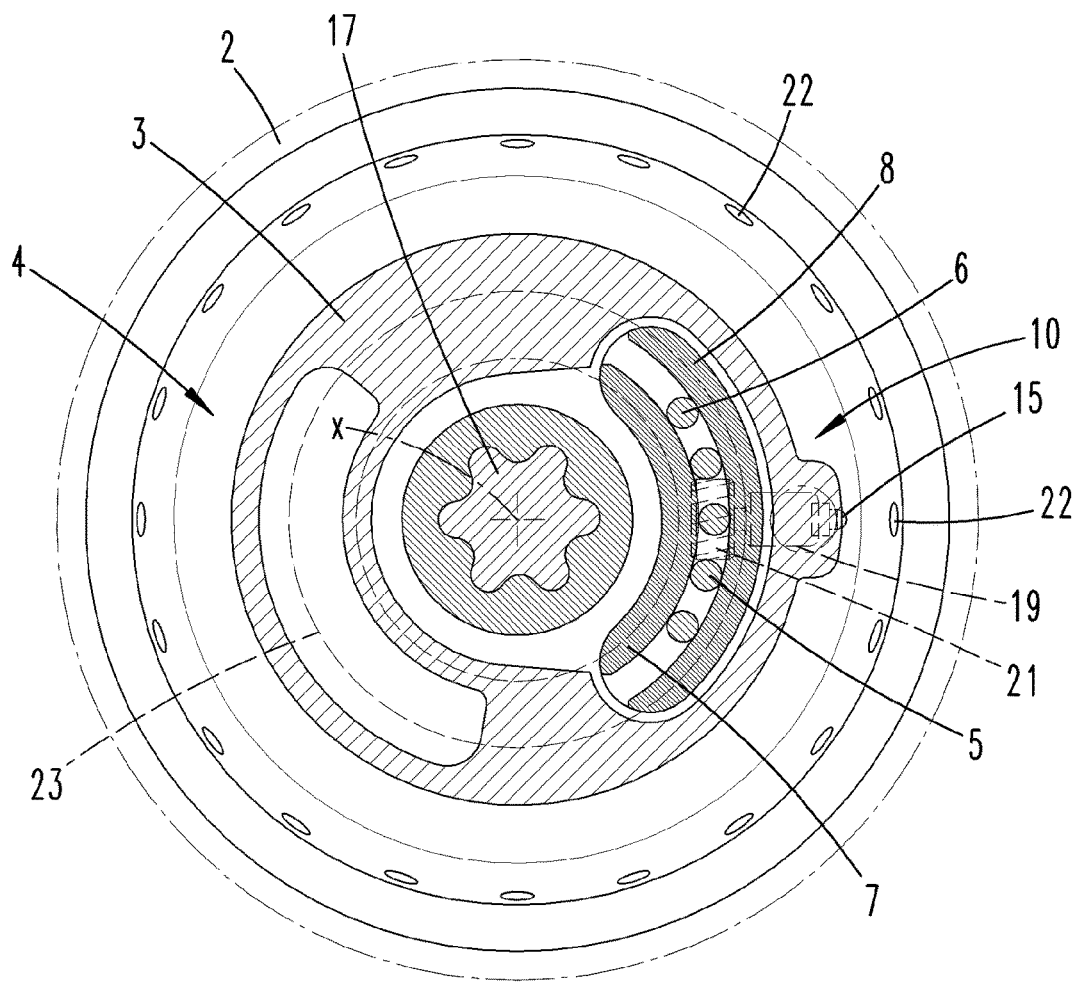
Figure 9:
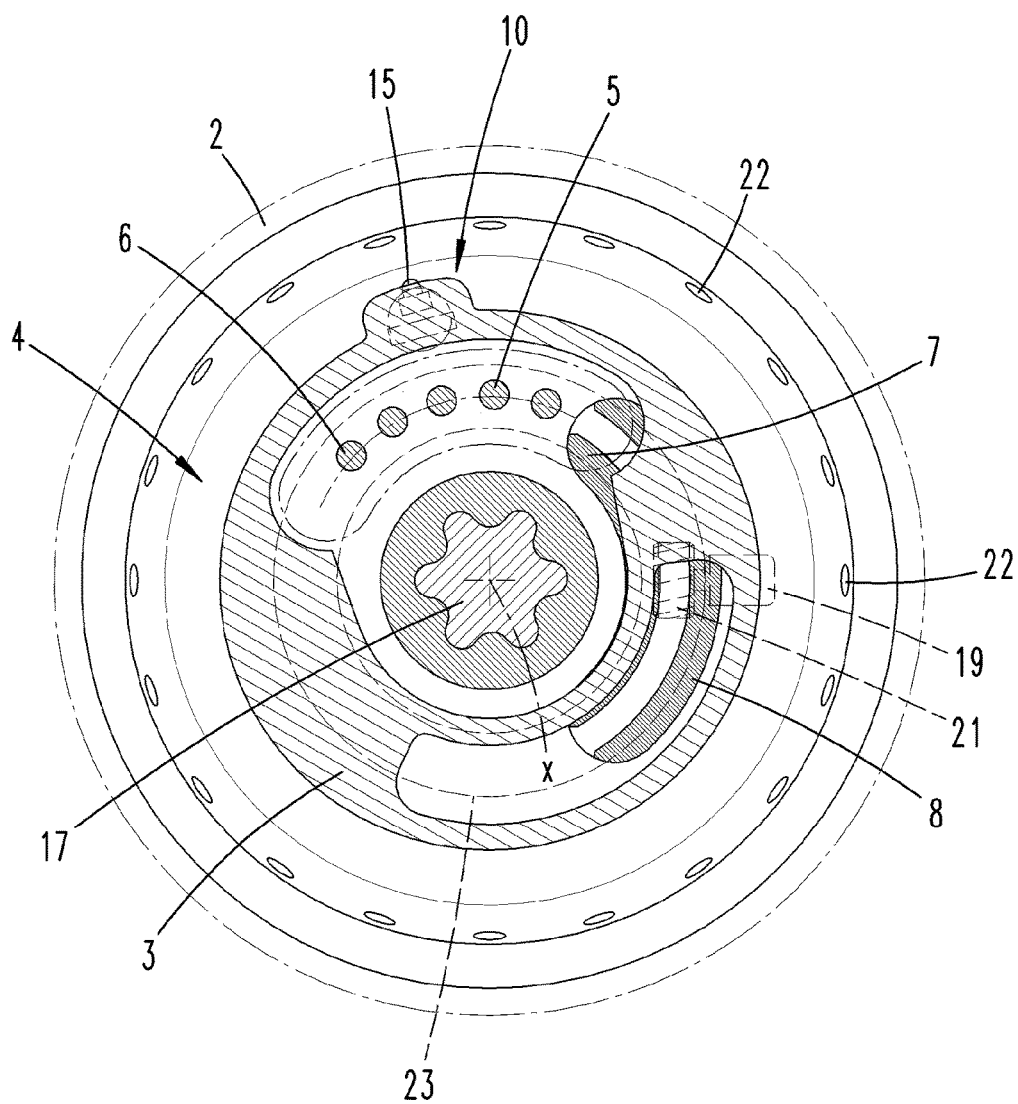

FIG. 1 shows a kitchen appliance comprising a vessel arranged thereon in a perspective view, FIG. 2 shows the kitchen appliance according to FIG. 1 without vessel, FIG. 3 shows a partial area of the vessel according to a first embodiment in a perspective view from the bottom, FIG. 4 shows a partial area of a kitchen appliance comprising a vessel arranged thereon according to FIG. 3 in a vertical cross section, FIG. 5 shows a partial area from FIG. 4, which is illustrated in an enlarged manner, FIG. 6 shows the kitchen appliance comprising a vessel arranged thereon according to FIG. 4 in a top view, FIG. 7 shows a partial area of a vessel receiving area of a kitchen appliance, which is illustrated in an enlarged manner, according to a second embodiment, FIG. 8 shows a horizontal cross section through the partial area of the kitchen appliance according to FIG. 7 in a contact position, FIG. 9 shows a horizontal cross section according to FIG. 8 in a separated position, FIG. 10 shows a partial area of a vessel receiving area of a kitchen appliance, which is illustrated in an enlarged manner, according to a third embodiment.

A kitchen appliance 1, here a mixer, comprising a housing 2, on which a vessel receiving area 4 is embodied for inserting a vessel 3, is initially illustrated and described with regard to FIGS. 1 and 2.

The vessel 3 can have a mixing unit 16, for example, which can be connected to a mixing unit connection 17 of the vessel receiving area 4. The connection takes place by inserting the vessel 3 into the vessel receiving area 4 of the kitchen appliance 1. The mixing unit 16 is operated via an electric drive, which is arranged in the kitchen appliance 1 below the vessel receiving area 4 and which is not illustrated in detail. The operation of the kitchen appliance 1 takes place via turning knobs and switches, as is customary. In addition, the kitchen appliance 1 can have a display 14 for displaying selection options or the like.

As illustrated in FIG. 1, the vessel 3 can be closed by means of a lid 13. In a state of the vessel 3, in which it is inserted into the vessel receiving area 4 of the kitchen appliance 1, the lid 13 can be locked to the vessel 3 by means of locking elements 24 of the kitchen appliance 1. The locking elements 24 are locking rollers here, for example.

The vessel receiving area 4 is substantially embodied here so as to correspond to the shape of the lower partial area of the vessel 3. The vessel 3 can be rotated in different rotational positions inside the vessel receiving area 4, so that the user of the kitchen appliance 1 does not need to make sure to insert the vessel 3 into the vessel receiving area 4 with a certain orientation in circumferential direction.

In FIG. 2, the kitchen appliance 1 is illustrated without a vessel 3, which is inserted into the vessel receiving area 4. To be able to remove the vessel 3 from the vessel receiving area 4, the locking elements 24 are pivoted upwards. The mixing unit connection 17 is arranged centrally in the vessel receiving area 4 for connection to the mixing unit 16 of the vessel 3. The mixing unit 16 and the mixing unit connection 17 are embodied so as to correspond with regard to shape such that a torque can be transferred from the mixing unit connection 17 to the mixing unit 16. Electric contacts 7, 8, by means of which an electric connection to electric contacts 5, 6 of the vessel 3 can be established, are arranged on the vessel receiving area 4. The electric contacts 7, 8 of the vessel receiving area 4 are embodied in the shape of a curve along a circular path, that is, as circular path sections, wherein each of the electric contacts 7, 8 is located on a different circular path. The electric contacts 7, 8 are arranged parallel next to one another in radial direction of the circular paths, wherein a first electric contact 7 is arranged on a circular path comprising a smaller radius than a second electric contact 8. A gap area for arranging corresponding contacts 5, 6 of a vessel 3 is embodied between the electric contacts 7, 8. This gap area, which is also embodied in the shape of a curve between the electric contacts 7, 8, can receive the electric contacts 5, 6 of the vessel 3 continuously in circumferential direction of a circular path, so that an electric connection between the vessel 3 and the vessel receiving area 4 can also exist in response to a different orientation of the vessel 3 to the vessel receiving area 4. It is only required for the electric contacts 5, 6 of the vessel 3 to be received between the electric contacts 7, 8 of the vessel receiving area 4. The angular range, which the electric contacts 7, 8 of the vessel receiving area 4 span, specifies the tolerance range for a possible contact position between the electric contacts 5, 6 of the vessel and the electric contacts 7, 8 of the vessel receiving area in this regard.

Below, FIGS. 3 to 6 show a first embodiment alternative of the invention, in the case of which a positioning device 10 is arranged on the vessel 3.

FIG. 3 shows a lower partial area of the vessel 3, which has the mixing unit connection 17 as well as a plurality of electric contacts 5, 6 for establishing an electric connection to the vessel receiving area 4 of the kitchen appliance 1. The electric contacts 5, 6 (here a total of five contacts), are arranged downstream from one another along a circular path, wherein the electric contacts 5, 6 remain on this circular path even in response to a rotation of the vessel 3 inside the vessel receiving area 4.

FIG. 4 shows a vertical cross section of the vessel receiving area 4 of the kitchen appliance 1, into which the vessel 3 is inserted. FIG. 5 shows a partial area thereof in an enlarged illustration.

In detail, the enlarged illustration according to FIG. 5 shows the lower partial area of the vessel 3 comprising a partial area of the mixing unit 16, which is connected to the mixing unit connection 17 of the vessel receiving area of the kitchen appliance 1. It can be seen in the illustrated cross section that the electric contacts 5, 6 of the vessel 3 engage between the electric contacts 7, 8 of the vessel receiving area 4. The electric contacts 5, 6 of the vessel 3 are arranged on a circular path, which corresponds to the circular path of the gap area embodied between the electric contacts 7, 8 of the vessel receiving area 4, so that the electric contacts 5, 6 of the vessel 3 can also remain engaged with the electric contacts 7, 8 of the vessel receiving area 4 in response to a rotation of the vessel 3 inside the vessel receiving area 4 of the kitchen appliance 1. The contact position between the electric contacts 5, 6 and the electric contacts 7, 8 remains as long as the circular path sections of the electric contacts 5, 6 of the vessel 3 and of the electric contacts 7, 8 of the vessel receiving area 4 still overlap. The contact position can thus span a certain angular range, for example in that a circular path section of the electric contacts 7, 8 of the vessel receiving area 4 is larger than a circular path section, which is spanned by the electric contacts 5, 6 of the vessel 3.

The positioning device 10 has an electric motor 19, an adjusting mechanism 21 as well as a rotary plate 23, on which the electric contacts 5, 6 of the vessel 3 are arranged. The electric motor 19 is connected to a power supply (not illustrated here), for example a battery. In response to an actuation of the positioning device 10, the electric motor 19 acts on the adjusting mechanism 21, which is embodied here as gear wheel, for example. As a result of the rotation of the gear wheel, the rotary plate 23 rotates about the axis of rotation x, which coincides with the central axis of the vessel receiving area 4. As a result of the rotation of the rotary plate 23, the electric contacts 5, 6 of the vessel 3, which are arranged thereon, also rotate. The position of the electric contacts 5, 6 can thus also be changed, if the vessel 3 as such maintains its orientation relative to the vessel receiving area 4 of the kitchen appliance 1.

A detection device 15, which is arranged on the vessel receiving area 4 and which is embodied to detect the current position of the electric contacts 5, 6 of the vessel 3, is assigned to the positioning device 10 of the vessel 3. Here, the detection device 15 is an ultrasound sensor, which is embodied to detect coded markings 22—for example in the form of material recesses—which are arranged in the same horizontal plane as the detection device 15. An analysis and control device 20 (see FIG. 7), which receives a detection signal from the detection device 15, is furthermore assigned to the detection device 15. This detection signal includes the current position of the electric contacts 5, 6 (in coded form). The analysis and control device 20 compares the detected position of the electric contacts 5, 6 of the vessel 3 (actual position) to the position of the electric contacts 7, 8 of the vessel receiving area 4 (target position). As result of the comparison, the analysis and control device 20 determines an angular difference between the electric contacts 5, 6 of the vessel 3 and the electric contacts 7, 8 of the vessel receiving area 4. Subsequently, the analysis and control device 20 controls the adjusting mechanism 21 and thus also a rotation of the rotary plate 23, so as to shift the actual position into the target position, that is, so as to bring about a contact position of the electric contacts 5, 6, 7, 8. Subsequently or also during the operation of the adjusting mechanism 21 or of the rotary plate 23, respectively, the detection device 15 continues to measure the current position of the electric contacts 5, 6 of the vessel 3.

FIG. 6 shows a top view onto a kitchen appliance 1, into the vessel receiving area 4 of which a vessel 3 according to FIG. 3 is inserted. The overlap of the circular path sections of the electric contacts 5, 6 of the vessel 3, which are arranged on the rotary plate 23, and the stationary electric contacts 7, 8 of the vessel receiving area 4 can be seen in particular.

FIGS. 7 to 9 show a second embodiment alternative of the invention, in the case of which the positioning device 10 is arranged on the vessel receiving area 4 of the kitchen appliance 1.

As illustrated in FIG. 7, the positioning device 10 has an electric motor 19, an adjusting mechanism 21 and a rotary plate 23. The electric motor 19 is connected to a power supply 9 (illustrated in FIG. 4) of the kitchen appliance 1. A detection device 15, which is arranged on the vessel 3, is assigned to the positioning device 10. The detection device 15 has a retroreflective sensor, for example. The latter has an LED, which—with regard to a direction starting at the central axis x of the vessel 3—emits radially outwards. Corresponding thereto, the vessel receiving area 4 of the kitchen appliance 1 has markings 22, which are arranged on an inner circumferential area of the vessel receiving area 4 at regular intervals, for example. The markings 22 can be material recesses, through which the emitted light can pass, or reflective partial areas, which have a higher degree of reflection than the partial areas outside of the markings 22. The detection device 15 is in communication connection with the analysis and control device 20 of the kitchen appliance 1. The analysis and control device 20 can use the markings 22 to draw a conclusion as to the current position, in which the electric contacts 5, 6 of the vessel 3 are to the electric contacts 7, 8 of the vessel receiving area 4. The markings can in particular be coded for this purpose. In the alternative, it is also possible for the current position of the electric contacts 5, 6 to be determined by counting the markings 22, starting at a zero position. The position detecting device 10 shifts the rotary plate 23 comprising the electric contacts 7, 8 of the vessel receiving area into the target position as a function of the result of the comparison between the current position of the electric contacts 5, 6 of the vessel 3 (target position) and the position of the electric contacts 7, 8 of the vessel receiving area 4 (actual position). The respective current position, in turn, can be examined by means of the detection device 15.

FIG. 8 shows a horizontal section through a plane of the vessel receiving area 4 or of the vessel 3, respectively, in which the electric contacts 5, 6, 7, 8 are arranged. The figure illustrates the contact position of the electric contacts 5, 6, 7, 8, in which the electric contacts 5, 6 of the vessel 3 are arranged between the electric contacts 7, 8 of the vessel receiving area 4. In the contact position, the position of the detection device 15 corresponds to the position of a marking 22. In this case, the analysis and control device 20 draws the conclusion that the contact position has been reached.

In contrast, FIG. 9 shows a separated position of the electric contacts 5, 6, 7, 8, in which the contacts 5, 6 of the vessel 3 and the contacts 7, 8 of the vessel receiving area 4 are not in contact, that is, are not located in the same angular range of the circular path sections shown by the contacts 5, 6 or by the contacts 7, 8, respectively. In this case, the analysis and control device 20 recognizes that the marking 22, which is adjacent to the detection device 15, has a coding, which does not correspond to the contact position. The analysis and control device 20 then transmits a command for rotating the rotary plate 23 to the position detection device 10.

FIG. 10 shows a third embodiment alternative of the invention, in the case of which the vessel 3 and the vessel receiving area 4 are equipped with corresponding magnets 11, 12. If the vessel 3 is not inserted into the vessel receiving area 4 in the desired contact position, the vessel 3 is pulled (rotated) automatically into the contact position as a result of the magnetic force. To facilitate the rotation—that is, overcoming frictional forces—the vessel 3 can be arranged on a rotary plate 23 (not illustrated). Instead of a separate magnet 11 on the vessel receiving area 4 and instead of a separate magnet 12 on the vessel 3, one of the magnets, preferably the magnet 11 of the vessel 3, can also be formed by a magnetic or magnetizable partial area of the vessel 3. A partial area of the vessel 3, for example, can have a magnetic material, for example iron or nickel, in circumferential direction.

LIST OF REFERENCE NUMERALS 1 kitchen appliance
2 housing
3 vessel
4 vessel receiving area
5 electric contact
6 electric contact
7 electric contact
8 electric contact
9 power supply
10 positioning device
11 magnet
12 magnet
13 lid
14 display
15 detection device
16 mixing unit
17 mixing unit connection
18 mixing unit appendage
19 electric motor
20 analysis and control device
21 adjusting mechanism
22 marking
23 rotary plate
24 locking element
x axis

The invention claimed is:

1. A kitchen appliance comprising:
a housing having a vessel receiving area,
a power supply, and
a positioning device,
wherein the vessel receiving area has electric contacts for connecting an electric device of a vessel to the power supply,
wherein the positioning device is embodied to position the electric contacts in an active manner, so that the electric contacts can be transferred from a separated position into a contact position, so as to establish an electric connection between the vessel and the kitchen appliance, and
wherein the contacts of the vessel receiving area are movably arranged on the vessel receiving area.

2. The kitchen appliance according to claim 1, wherein the positioning device has a rotary plate, on which the contacts of the vessel receiving area are arranged.

3. The kitchen appliance according to claim 1, wherein the positioning device has an electric motor for positioning the contacts.

4. The kitchen appliance according to claim 1, wherein the positioning device has spring elements, and
wherein the spring elements spring-load the contacts of the vessel receiving area.

5. A kitchen appliance comprising:
a housing having a vessel receiving area,
a power supply, and
a positioning device,
wherein the vessel receiving area has electric contacts for connecting an electric device of a vessel to the power supply,
wherein the positioning device is embodied to position the electric contacts of the vessel receiving area in such a manner that the electric contacts can be transferred from a separated position into a contact position, so as to establish an electric connection between the vessel and the kitchen appliance, and
wherein the positioning device has a magnet arranged on the vessel receiving area.

6. The kitchen appliance according to claim 1, wherein the kitchen appliance has a detection device, which is embodied to detect a current position of the contacts.

7. The kitchen appliance according to claim 6, wherein the detection device is assigned to the positioning device.

8. The kitchen appliance according to claim 6, wherein the kitchen appliance has an analysis and control device, which is embodied to compare a current position of the contacts detected by the detection device to a position of the contacts which is required for the electric connection, and to transmit a positioning command to the positioning device as a function of the result of the comparison.

9. The kitchen appliance according to claim 1, wherein the kitchen appliance is a mixer.

10. A kitchen appliance comprising:
a housing having a vessel receiving area,
a vessel arranged on the housing, the vessel being connected to the vessel receiving area and comprising an electric device and a positioning device, and
a power supply, and
wherein the vessel and the vessel receiving area have electric contacts for connecting the electric device of the vessel to the power supply,
wherein the positioning device is embodied to position the electric contacts of the vessel relative to the electric contacts of the vessel receiving area in an active manner, so that the electric contacts can be transferred from a separated position into a contact position, so as to establish an electric connection between the vessel and the housing, and
wherein the contacts of the vessel are movably arranged on the vessel.

11. The kitchen appliance according to claim 10, wherein the positioning device has a rotary plate, and
wherein the electric contacts of the vessel are arranged on the rotary plate.

12. The kitchen appliance according to claim 10, wherein the positioning device has an electric motor for positioning the electric contacts.

13. The kitchen appliance according to claim 10, wherein the positioning device has spring elements, and
wherein the spring elements spring-load the electric contacts of the vessel.

14. The kitchen appliance according to claim 10, wherein the kitchen appliance is a mixer.

15. The kitchen appliance according to claim 10, wherein the electric device of the vessel is a heating device and/or a measuring device.

16. A kitchen appliance comprising:
a housing having a vessel receiving area, the vessel receiving area comprising a first magnet,
a vessel arranged on the housing, the vessel being connected to the vessel receiving area and comprising an electric device and a second magnet, and
a power supply,
wherein the vessel and the vessel receiving area have electric contacts for connecting the electric device of the vessel to the power supply, and
wherein the first magnet and the second magnet are embodied to position the electric contacts of the vessel relative to the electric contacts of the vessel receiving area in such a manner that the electric contacts can be transferred from a separated position into a contact position, so as to establish an electric connection between the vessel and the housing.

17. The kitchen appliance according to claim 16, wherein the kitchen appliance is a mixer.

18. The kitchen appliance according to claim 16, wherein the electric device of the vessel is a heating device and/or a measuring device.

\* \* \* \* \*